(12) United States Patent
Dehn et al.

(10) Patent No.: US 8,606,799 B2
(45) Date of Patent: Dec. 10, 2013

(54) SOFTWARE AND METHOD FOR UTILIZING A GENERIC DATABASE QUERY

(75) Inventors: Rene Dehn, Sinsheim (DE); Martin Kaiser, Speyer (DE)

(73) Assignee: SAP AG, Walldorf (DE)

( * ) Notice: Subject to any disclaimer, the term of this patent is extended or adjusted under 35 U.S.C. 154(b) by 1280 days.

(21) Appl. No.: 11/647,802

(22) Filed: Dec. 28, 2006

(65) Prior Publication Data

US 2008/0162457 A1   Jul. 3, 2008

(51) Int. Cl.
*G06F 17/30* (2006.01)

(52) U.S. Cl.
CPC ..................................... *G06F 17/30* (2013.01)
USPC ........... 707/758; 707/769; 707/770; 707/791; 707/802; 707/803

(58) Field of Classification Search
USPC ....... 707/1–7, 100, 102, 103 R, 103 Z, 104.1, 707/200–201, 601, 609, 790–793, 796, 807, 707/961–962, 758, 769, 770, 802–803; 706/45–50; 715/968
See application file for complete search history.

(56) References Cited

U.S. PATENT DOCUMENTS

| | | | |
|---|---|---|---|
| 5,129,082 A | | 7/1992 | Tirfing et al. |
| 5,555,403 A | * | 9/1996 | Cambot et al. ..................... 707/4 |
| 5,584,024 A | * | 12/1996 | Shwartz ............................. 707/4 |
| 5,701,453 A | * | 12/1997 | Maloney et al. ................... 707/2 |
| 5,701,460 A | * | 12/1997 | Kaplan et al. ..................... 707/3 |
| 5,806,075 A | | 9/1998 | Jain et al. |
| 5,809,497 A | | 9/1998 | Freund et al. |
| 5,895,465 A | | 4/1999 | Guha |
| 5,907,846 A | * | 5/1999 | Berner et al. ............. 707/103 R |
| 5,917,965 A | | 6/1999 | Cahill et al. |
| 5,974,421 A | | 10/1999 | Krishnaswamy et al. |
| 6,023,696 A | * | 2/2000 | Osborn et al. ..................... 707/3 |
| 6,035,294 A | | 3/2000 | Fish |
| 6,035,300 A | * | 3/2000 | Cason et al. ................... 707/102 |
| 6,067,552 A | | 5/2000 | Yu |
| 6,078,926 A | | 6/2000 | Jensen et al. |
| 6,085,189 A | | 7/2000 | Pirahesh et al. |
| 6,108,651 A | | 8/2000 | Guha |
| 6,151,602 A | | 11/2000 | Hejlsberg et al. |
| 6,160,796 A | | 12/2000 | Zou |
| 6,181,837 B1 | | 1/2001 | Cahill et al. |
| 6,243,709 B1 | * | 6/2001 | Tung ......................... 707/103 R |
| 6,356,901 B1 | | 3/2002 | MacLeod et al. |
| 6,374,235 B1 | | 4/2002 | Chen et al. |

(Continued)

OTHER PUBLICATIONS

Li Xu et al. "A composite approach to automating direct and indirect schema mappings",Information Systems 31 (2006) 697-732.*

(Continued)

*Primary Examiner* — Srirama Channavajjala
(74) *Attorney, Agent, or Firm* — Fish & Richardson P.C.

(57) ABSTRACT

This disclosure provides various embodiments of software for identifying and utilizing a generic database query. In one aspect, the software identifies a generic query such that the generic query is independent of a particular database layout, and accesses a database table having a first layout using the generic query. In some implementations, the software may comprise a business application associated with a database, where the generic query is embedded in the business application without knowledge of the associated database's table layout. In other implementations, the generic query may be embedded in the software before the database table is created.

29 Claims, 5 Drawing Sheets

(56) References Cited

U.S. PATENT DOCUMENTS

| | | |
|---|---|---|
| 6,405,209 B2 | 6/2002 | Obendorf |
| 6,434,558 B1 | 8/2002 | MacLeod et al. |
| 6,460,052 B1 | 10/2002 | Thomas et al. |
| 6,516,326 B1 | 2/2003 | Goodrich et al. |
| 6,601,071 B1* | 7/2003 | Bowker et al. ................ 707/102 |
| 6,609,123 B1* | 8/2003 | Cazemier et al. ................ 707/4 |
| 6,636,846 B1* | 10/2003 | Leung et al. ..................... 707/2 |
| 6,668,263 B1 | 12/2003 | Cranston et al. |
| 6,721,754 B1 | 4/2004 | Hurst et al. |
| 6,763,352 B2* | 7/2004 | Cochrane et al. ................. 707/4 |
| 6,820,076 B2 | 11/2004 | Bailey et al. |
| 6,829,606 B2* | 12/2004 | Ripley .............................. 707/5 |
| 6,895,412 B1 | 5/2005 | Hutchinson |
| 6,938,029 B1 | 8/2005 | Tien |
| 7,085,757 B2* | 8/2006 | Dettinger et al. ................. 707/3 |
| 7,085,784 B2 | 8/2006 | Krishna et al. |
| 7,152,073 B2 | 12/2006 | Gudbjartsson et al. |
| 7,225,177 B2 | 5/2007 | Wu et al. |
| 7,249,118 B2 | 7/2007 | Sandler et al. |
| 7,373,393 B2 | 5/2008 | Sonoda et al. |
| 7,383,284 B2 | 6/2008 | Heinrichs et al. |
| 7,383,288 B2 | 6/2008 | Miloushev et al. |
| 7,406,457 B2 | 7/2008 | Kaiser |
| 7,409,387 B2 | 8/2008 | Dietel |
| 7,424,685 B2 | 9/2008 | Behrens et al. |
| 7,496,596 B2 | 2/2009 | Li et al. |
| 2002/0087558 A1 | 7/2002 | Bailey et al. |
| 2002/0111960 A1 | 8/2002 | Irons et al. |
| 2002/0147725 A1 | 10/2002 | Janssen et al. |
| 2003/0120665 A1 | 6/2003 | Fox et al. |
| 2003/0204450 A1 | 10/2003 | Heinrichs et al. |
| 2003/0204480 A1 | 10/2003 | Heinrichs et al. |
| 2003/0208417 A1 | 11/2003 | Heinrichs et al. |
| 2004/0036719 A1* | 2/2004 | Van Treeck .................. 345/763 |
| 2004/0093344 A1 | 5/2004 | Berger et al. |
| 2004/0153469 A1 | 8/2004 | Keith-Hill |
| 2004/0163041 A1 | 8/2004 | Engel |
| 2004/0193087 A1 | 9/2004 | Albus et al. |
| 2004/0216030 A1 | 10/2004 | Hellman et al. |
| 2005/0010606 A1 | 1/2005 | Kaiser et al. |
| 2005/0019854 A1 | 1/2005 | Gross et al. |
| 2005/0060286 A1 | 3/2005 | Hansen et al. |
| 2005/0076023 A1 | 4/2005 | Wu et al. |
| 2005/0086201 A1 | 4/2005 | Weddeling et al. |
| 2005/0097568 A1 | 5/2005 | Behrens et al. |
| 2005/0108237 A1 | 5/2005 | Sonoda et al. |
| 2005/0108272 A1 | 5/2005 | Behrens et al. |
| 2005/0114318 A1* | 5/2005 | Dettinger et al. ................ 707/3 |
| 2005/0147300 A1 | 7/2005 | Dresevic et al. |
| 2005/0149484 A1 | 7/2005 | Fox et al. |
| 2005/0149584 A1 | 7/2005 | Boubonnais et al. |
| 2005/0198003 A1 | 9/2005 | Duevel et al. |
| 2005/0256852 A1 | 11/2005 | McNall et al. |
| 2005/0278395 A1 | 12/2005 | Sandaire |
| 2005/0284934 A1 | 12/2005 | Ernesti et al. |
| 2005/0289020 A1 | 12/2005 | Bruns et al. |
| 2006/0020578 A1 | 1/2006 | Hood |
| 2006/0047622 A1 | 3/2006 | Folkert et al. |
| 2006/0047638 A1 | 3/2006 | Dettinger et al. |
| 2006/0074914 A1 | 4/2006 | Kaiser |
| 2006/0074979 A1 | 4/2006 | Kaiser |
| 2006/0085372 A1 | 4/2006 | Kaiser |
| 2006/0136354 A1 | 6/2006 | Bell et al. |
| 2006/0136481 A1 | 6/2006 | Dehn et al. |
| 2006/0224487 A1 | 10/2006 | Galdi |
| 2006/0253470 A1 | 11/2006 | Friedman et al. |
| 2006/0288036 A1 | 12/2006 | Sadovsky et al. |
| 2006/0294120 A1 | 12/2006 | Li et al. |
| 2007/0005552 A1 | 1/2007 | Klein et al. |
| 2007/0005599 A1 | 1/2007 | Klein et al. |
| 2007/0005640 A1 | 1/2007 | Klein et al. |
| 2007/0005666 A1 | 1/2007 | Klein et al. |
| 2007/0016596 A1 | 1/2007 | Fabret et al. |
| 2007/0097076 A1 | 5/2007 | Gross |
| 2007/0100868 A1 | 5/2007 | Hackmann |
| 2007/0162468 A1 | 7/2007 | Dentzer et al. |
| 2007/0174309 A1 | 7/2007 | Pettovello |
| 2007/0271161 A1 | 11/2007 | Kaiser |
| 2007/0282858 A1 | 12/2007 | Arner et al. |
| 2008/0033907 A1* | 2/2008 | Woehler et al. ................... 707/2 |
| 2008/0086409 A1 | 4/2008 | Moorman et al. |
| 2008/0098003 A1 | 4/2008 | Dias et al. |
| 2008/0126969 A1 | 5/2008 | Blomquist |
| 2008/0154950 A1 | 6/2008 | Gross |
| 2008/0162205 A1 | 7/2008 | Gross |
| 2008/0162207 A1 | 7/2008 | Gross et al. |
| 2008/0162415 A1 | 7/2008 | Kaiser et al. |
| 2008/0162492 A1* | 7/2008 | Dehn et al. ....................... 707/10 |
| 2008/0162563 A1 | 7/2008 | Gross et al. |
| 2008/0162616 A1 | 7/2008 | Gross et al. |
| 2008/0162777 A1 | 7/2008 | Kaiser et al. |

OTHER PUBLICATIONS

U.S. Appl. No. 60/724,983.*
Office Action issued in related U.S. Appl. No. 11/647,768 on Nov. 17, 2008; 19 pages.
Office Action issued in related U.S. Appl. No. 11/647,768 on May 1, 2009; 22 pages.
Advisory Action issued in related U.S. Appl. No. 11/647,768 on Jul. 8, 2009; 3 pages.
Office Action issued in related U.S. Appl. No. 11/647,909 on Nov. 24, 2008; 15 pages.
Office Action issued in related U.S. Appl. No. 11/647,909 on May 1, 2009; 20 pages.
United States Patent Office's prosecution file for U.S. Appl. No. 11/647,768; 181 pages.
United States Patent Office's prosecution file for U.S. Appl. No. 11/647,909; 216 pages.
Reinwald et al.; "Heterogeneous Query Processing through SQL Table Functions"; Data Engineering 1999 Proceedings of 15th International Conference; Mar. 23-26, 1999; pp. 366-373.
Kornacker, Marcel; "Access Methods for Next Generation Database Systems"; University of California—Berkeley; Fall 2000; pp. 1-164.
Breunig et al.; "Chapter 7: Architectures and Implementations of Spatio-Temporal Database Management Systems"; Springer Berlin/Heidelberg; Sep. 16, 2003; pp. 263-318.
Advisory Action issued in U.S. Appl. No. 11/647,909 on Jul. 20, 2009; 3 pages.
Advisory Action issued in U.S. Appl. No. 11/647,909 on Aug. 12, 2009; 3 pages.
Notice of Allowance issued in U.S. Appl. No. 11/647,909 on Sep. 21, 2009; 13 pages.
Notice of Allowance issued in U.S. Appl. No. 11/647,909 on Jan. 14, 2010; 9 pages.
Notice of Panel Decision from Pre-Appeal Brief Review issued in U.S. Appl. No. 11/647,769 on Sep. 17, 2009; 3 pages.
Examiner's Answer to Appeal Brief issued in U.S. Appl. No. 11/647,768 on Dec. 2, 2009; 22 pages.

* cited by examiner

FIG. 5

| FIELD | KEY | DATA TYPE | LENGTH |
|---|---|---|---|
| keyfield | ✓ | NUMBER | 10 |
| text_field | | TEXT | 15 |
| char_field | | CHAR | 20 |
| date_time | | DATETIME | 8 |

FIG. 6

| FIELD NAME | STATUS | CRITERIA |
|---|---|---|
| keyfield | ACTIVE | * |
| text_field | ACTIVE | CONTAINS "TEST" |
| char_field | ACTIVE | =1000 |
| date_time | ACTIVE | OCTOBER 20 |
| ~PLACEHOLDER | INACTIVE | |

FIG. 7

| FIELD | KEY | DATA TYPE | LENGTH |
|---|---|---|---|
| keyfield | ✓ | NUMBER | 10 |
| text_field | | TEXT | 15 |
| char_field | | CHAR | 20 |
| date_time | | DATETIME | 8 |
| int_field | | INT | 3 |
| real_field | | REAL | 5 |

SOFTWARE AND METHOD FOR UTILIZING A GENERIC DATABASE QUERY

TECHNICAL FIELD

This disclosure generally relates to data access and presentation and, more specifically, to systems, methods, and software identifying, executing, or otherwise utilizing a generic query for accessing a plurality of database tables.

BACKGROUND

Many current software applications provide database inter-connectivity to populate an application framework with dynamic information to users that is retrieved upon command from a back-end database. Many of these applications work with data from multiple database tables simultaneously. Current standard database design may call for normalization—the process of organizing information into a plurality of database tables—in order to increase efficiency and performance. Normalization is often meant to eliminate redundant data and to ensure that data dependencies are logically created. Even where normalization is not present, related data is frequently located in multiple database tables of various structures. In many situations, in order for an application to retrieve desired information from one or more of the database tables, the coding used to access each database table is written or created for each database table's specific structure. Accordingly, each time a database table is added, modified, or deleted, the coding for accessing that specific database table would be adapted or rewritten.

SUMMARY

This disclosure provides various embodiments of software for identifying and utilizing a generic database query. In one aspect, the software identifies a generic query such that the generic query is independent of a particular database layout, and accesses a database table having a first layout using the generic query. In some implementations, the software may comprise a business application associated with a database, where the generic query is embedded in the business application without knowledge of the associated database's table layout. In other implementations, the generic query may be embedded in the software before the database table is created.

In another aspect, the software accesses a database table having a first layout using a first instance of a generic query that is independent of a particular database layout, modifies the database table such that the database table has a second layout, and then accesses the database table having a second layout using a second instance of the generic query. In some implementations the generic query is comprised of at least one placeholder. In other implementations, modifying the database table is performed by appending at least one data field into the database table or joining a table to the database table.

The foregoing example software—as well as other disclosed processes—may also be computer implementable methods. Moreover, some or all of these aspects may be further included in respective systems or other devices for identifying and utilizing a generic database query. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 5 illustrates the design view of a database table having a first layout as utilized by the example system of FIG. 1;

FIG. 6 illustrates the design view of a generic query as utilized by the example system of FIG. 1;

FIG. 7 illustrates the design view of the database table in FIG. 5 having a second layout after the first layout has been modified by the example system of FIG. 1;

DETAILED DESCRIPTION

Figure 1:
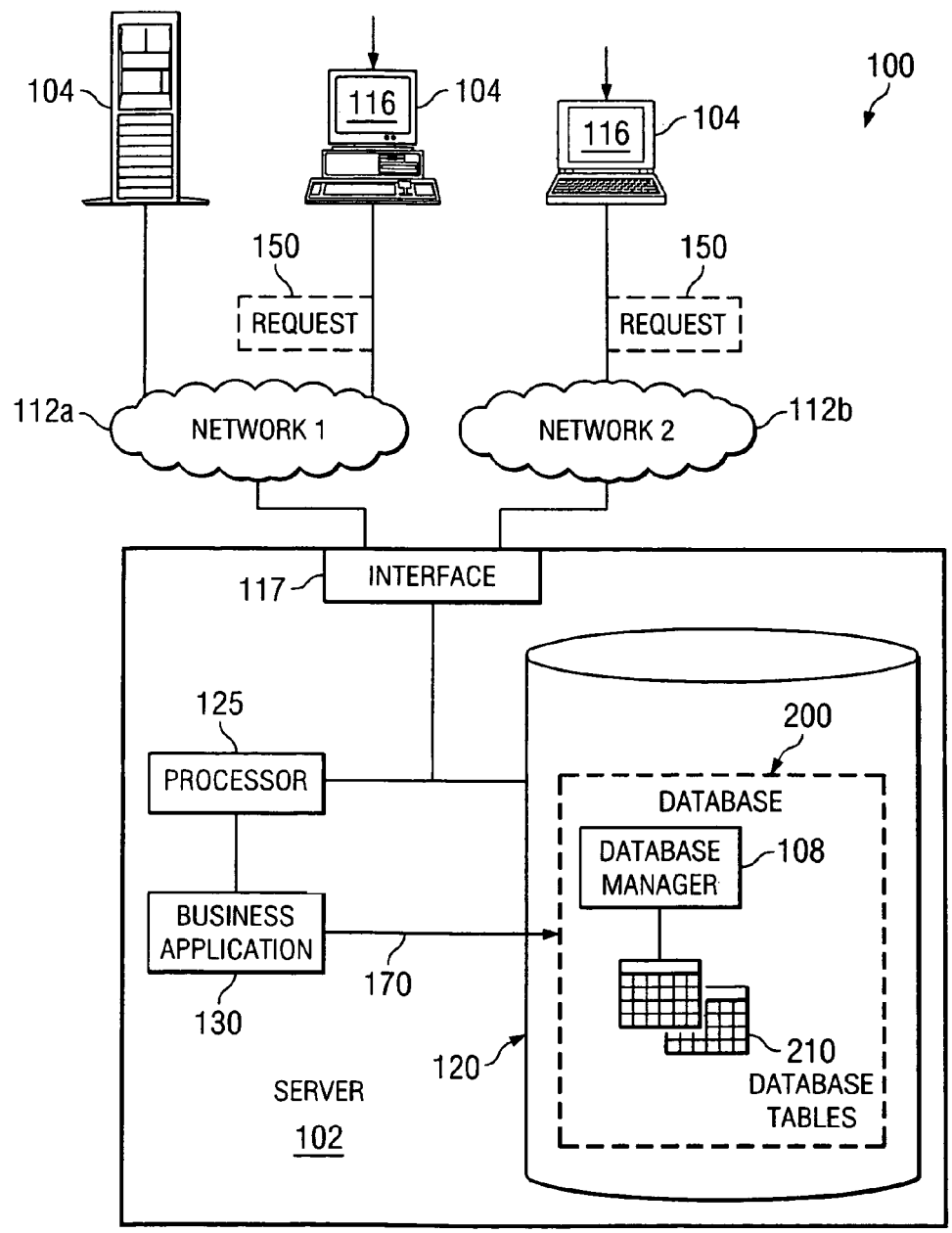
FIG. 1 illustrates a database environment implementing a common database layout technique according to a particular implementation of the present disclosure.

FIG. 1 illustrates a database environment 100 for storing or retrieving (or otherwise managing) information in at least a portion of enterprise or data processing environment in accordance with a particular implementation of a system and method for providing a common database layout of database tables 210 located in a database 200, which is often a relational database. In certain embodiments, environment 100 automatically (or based on a request from a user or application) provides a common layout for the database tables 210 of database 200 by requiring the database tables 210 to implement a generic index field to be used in accessing tables without regard to their structure. For example, the user or application may require records from a plurality of database tables 210. Based on this need, environment 100 provides a generic index for the database tables 210 such that a common data field is present in each database table that the user requires records from, thus allowing for data access to each of the two or more database tables 210, regardless of their overall structure. More specifically, environment 100 allows a single query selecting data records based on the generic index to access a plurality of database tables 210 without knowledge of the particular structure of each database table 210. As such, users may access a plurality of database tables 210 generically via the generic index, thereby potentially providing a reusable technique of accessing records without the need to adapt the access coding when new database tables 210 are included in a user and/or application request after updates to previous database tables 210 have been made.

In other alternate or complimentary embodiments, environment 100 provides, processes, or otherwise utilizes a generic query 170 for database tables 210 located in database 200. At a high level, query 170 is constructed such that any database table 210 will be accessible to query 170 regardless of the database table layout. For example, after having associated query 170 with database table 210 having a first database table layout, the table layout may change such that a second database layout is created. After database table 210 changes to a second layout, query 170 will not require additional coding or modification in order to access data records of database table 210. Additionally, multiple instances of query 170 may be used to access a plurality of database tables 210 having a plurality of database layouts without modifying query 170 for each database table 210 accessed. In other words, a particular application, database manager 108, or other software may utilize a first instance of query 170 to access a first table 210 and second instance of query 170 to access a second table 210 without relevant redesign, new or changed fields, or new structure. In some situations, query 170 may be designed prior to its association with a database table 210. Accordingly, query 170 is such that prior knowledge of a database table 210 and its structure is unnecessary to successfully access the data records of the table.

Environment 100 may be a distributed client/server system that allows clients 104 to submit requests to store and/or retrieve information from database 200 maintained on server 102. But environment 100 may also be a standalone computing environment or any other suitable environment, such as an administrator accessing data stored on server 102, without departing from the scope of this disclosure. When the database is stored in relational format, environment 100 may allow access to database 200 using a structured query language (SQL), which may include any of the plurality of versions of the SQL relational database query and manipulation language such as, for example, SEQUEL, ANSI SQL, any other proprietary or public variant of SQL, or other suitable or generic query language (such as extensible Markup Language (XML)).

In the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 200 and a database manager 108, which may be any set of logical instructions executed by processor 125 to perform tasks associated with database management and/or responding to queries, including storing information in memory 120, searching database 200, generating responses to queries using information in database 200, and numerous other related tasks. In particular embodiments, database manager 108 accesses database tables 210 in response to queries from clients 104. Database manager 108 is typically software and may be written or described in any appropriate computer language including, for example, C, C++, Java, Visual Basic, assembler, Perl, ABAP, any suitable version of 4GL, or any combination thereof. As used herein, software generally includes any appropriate combination of software, firmware, hardware, and/or other logic. It will be understood that while database manager 108 is illustrated in FIG. 1 as a single multi-tasked module, the features and functionality performed by this engine may be performed by multiple modules such as, for example, one or more agents or database instances. Further, while illustrated as internal to server 102, one or more processes associated with database manager 108 may be stored, referenced, or executed remotely. Moreover, database manager 108 may be a child or sub-module of another software module (such as database 200) without departing from the scope of this disclosure. In one embodiment, database manager 108 may be referenced by or communicably coupled with applications executing on or presented to client 104.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with database manager 108. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain embodiments, server 102 receives requests 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Server 102 may also include or reference a local, distributed, or hosted business application 130. In certain embodiments, business application 130 may request access to retrieve, modify, delete, or otherwise manage the information of one or more databases 200 in memory 120. Specifically, business application 130 may use query 170 to retrieve or modify data records stored in the database tables 210 that are requested by the user and/or application. Business application 130 may be considered business software or solution that is capable of interacting or integrating with databases 200 located, for example, in memory 120 to provide access to data for personal or business use. An example business application 130 may be a computer application for performing any suitable business process by implementing or executing a plurality of steps. One example of a business application 130 is one that may provide interconnectivity with one or more database tables 210 containing inventory or employee information such that records may be dispersed among a plurality of database tables 210. As a result, business application 130 may provide a method of accessing requested data and presenting it in a common layout such that users are provided information through a GUI interface 116 in a centralized and uniform display. Business application 130 may also provide the user with a computer implementable method of updating the information contained in the plurality of database tables 210 such that users may update, delete, and/or add database records for a plurality of database tables 210 while presented with a logical common database layout representing a plurality of database tables 210 or database tables with generic indices.

Business application 130 may provide one or more instances of query 170 to the databases 200, perhaps via database manger 108, for accessing database tables 210 stored therein. As mentioned above, environment 100 may allow access to database 200 using SQL, which may include any of the plurality of versions of the SQL relational database query and manipulation language such as, for example, SEQUEL, ANSI SQL, any other proprietary or public variant of SQL, or other suitable or generic database query language. Query 170 may be a generic query in which the query itself is independent of any particular database layout. As will be described further with respect to FIGS. 5 through 9, query 170 provides a mechanism such that business application 130 may access any database table 210, regardless of the actual structure present in said table. Query 170 may allow for multiple instances of the same generic query to be used in accessing a plurality of database tables 210, one or more having different database layouts than those previously accessed. In doing so, query 170 frees business application 130 from generating new queries each time the layout of a database table 210 is modified.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose.

Generally, GUI 116 provides the user of client 104 with an efficient and user-friendly presentation of data provided by or communicated within environment 100. GUI 116 may provide access to the front-end of business application 130 executing on client 104 that is operable to submit SQL queries 150 to one or more databases 200, accessing the database tables 210 of each database 200 through the generic indexes contained in each database table 210. In another example, GUI 116 may display output reports such as summary and detailed reports. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Mozilla Firefox) and return the appropriate HTML or XML responses using network 112. For example, server 102 may receive such an SQL query from client 104 using the web browser and then execute the parsed query to store and/or retrieve information in database 200.

Figure 2:
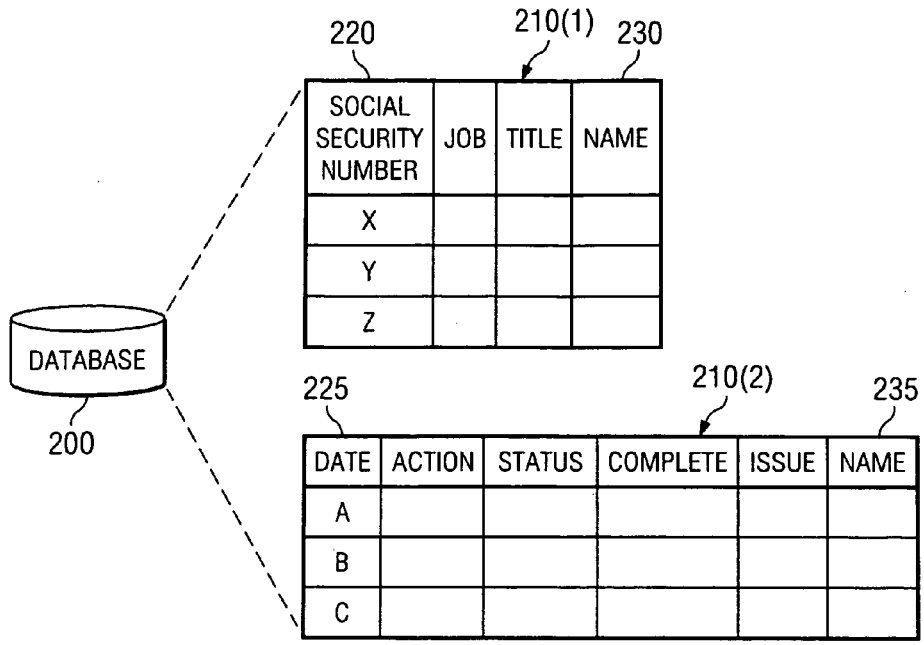
FIG. 2 illustrates the database structure and database table design prior to the addition of a generic index field as utilized by the example system of FIG. 1.

FIG. 2 represents database 200 containing a plurality of database tables 210. Database 200 may contain as many database tables 210 as memory 120 has storage availability. In the embodiment shown in FIG. 2, database 200 contains two database tables, 210(1) and 210(2), each having a different primary key field—table 210(1) contains the primary key field SSN 220, and table 210(2) contains the primary key field DATE 225. Additionally, the records may contain a foreign key used to create a relationship between the data records of related tables—table 210(1) and table 210(2) both contain a foreign key NAME 230 and 235, respectively. Query 170 may use the foreign keys 230 or 235 to access related data from the database tables 210(1) and 210(2). As discussed above, many applications work with data from a plurality of database tables 210 in order to provide information in response to requests from users and/or applications. Query 170 and other queries sent from business application 130 access a plurality of database tables 210 containing desired information. When the fields for each database table 210 are not similar or identical, accessing the tables becomes more difficult and requires knowledge of the particular structure of each table 210. In order to provide for simpler database accessing, database table 210(1) and database table 210(2) may be modified to provide for generic accessing that avoids the constraints of requiring specific structural knowledge of each database table 210 being accessed.

Figure 3:
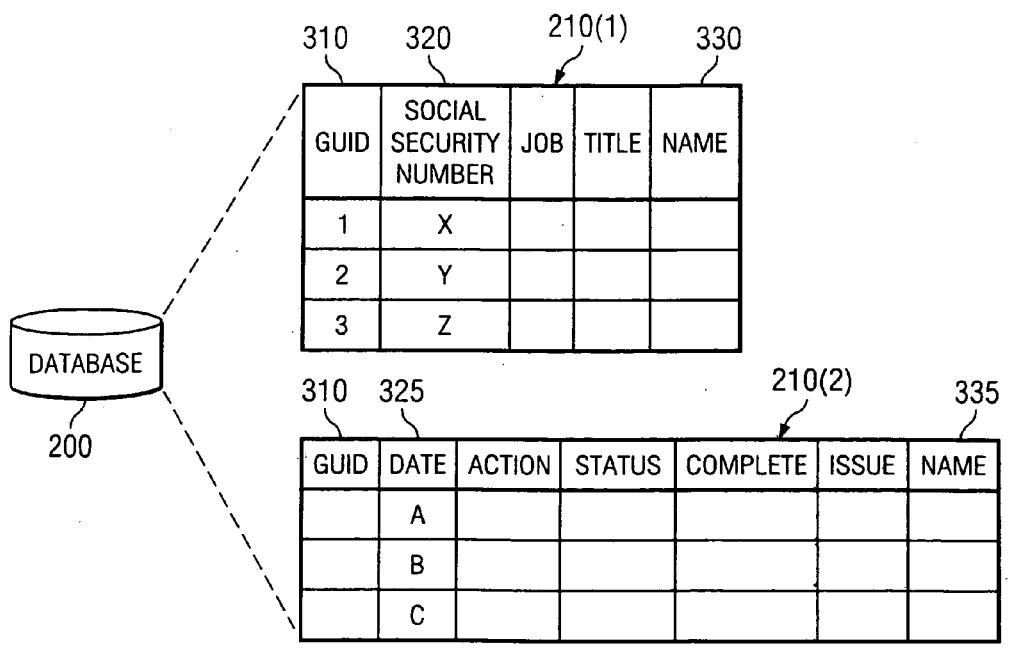
FIG. 3 illustrates the database structure and database table design with one example of a generic index field as utilized by the example system of FIG. 1.

One implementation of a common database layout is presented in FIG. 3. FIG. 3 represents a database 200 containing a plurality of database tables 210.

FIG. 3 illustrates tables 210 that include an example database field representing a generic index 310. The generic index 310 may comprise a client identifier, a global unique identifier (GUID), another unique value, or a combination thereof. Alternatively, the generic index 310 of each data record may include a combination of data from the other data fields of each record so as to create a combination of data unique to other records of the table. The generic index 310 provides a field common to each database table 210 in database 200 such that a user and/or application may access the database tables 210 generically. The new structure of each database table 210 may be defined as a key field representing the generic index 310, and all other data fields. Therefore, although the ultimate structure of each database table 210 of the plurality of tables may be different, the common database layout containing the generic index 310 provides a basis for generically accessing the database tables 210 without requiring further knowledge of each table's structure. Besides the addition of at least one generic index 310, the database tables 210 retain their previous structures; for example, tables 210(1) and 210(2) retain their primary keys 320, 325 and foreign keys 330, 335 after the addition of the generic index 310. One method of adding the generic index 310 is placing the generic index 310 into an include structure with a unique group name such that the include structure can be included in each database table 210. The include structure allows for uniform changes to be made across all tables by modifying the include structure.

Figure 4:
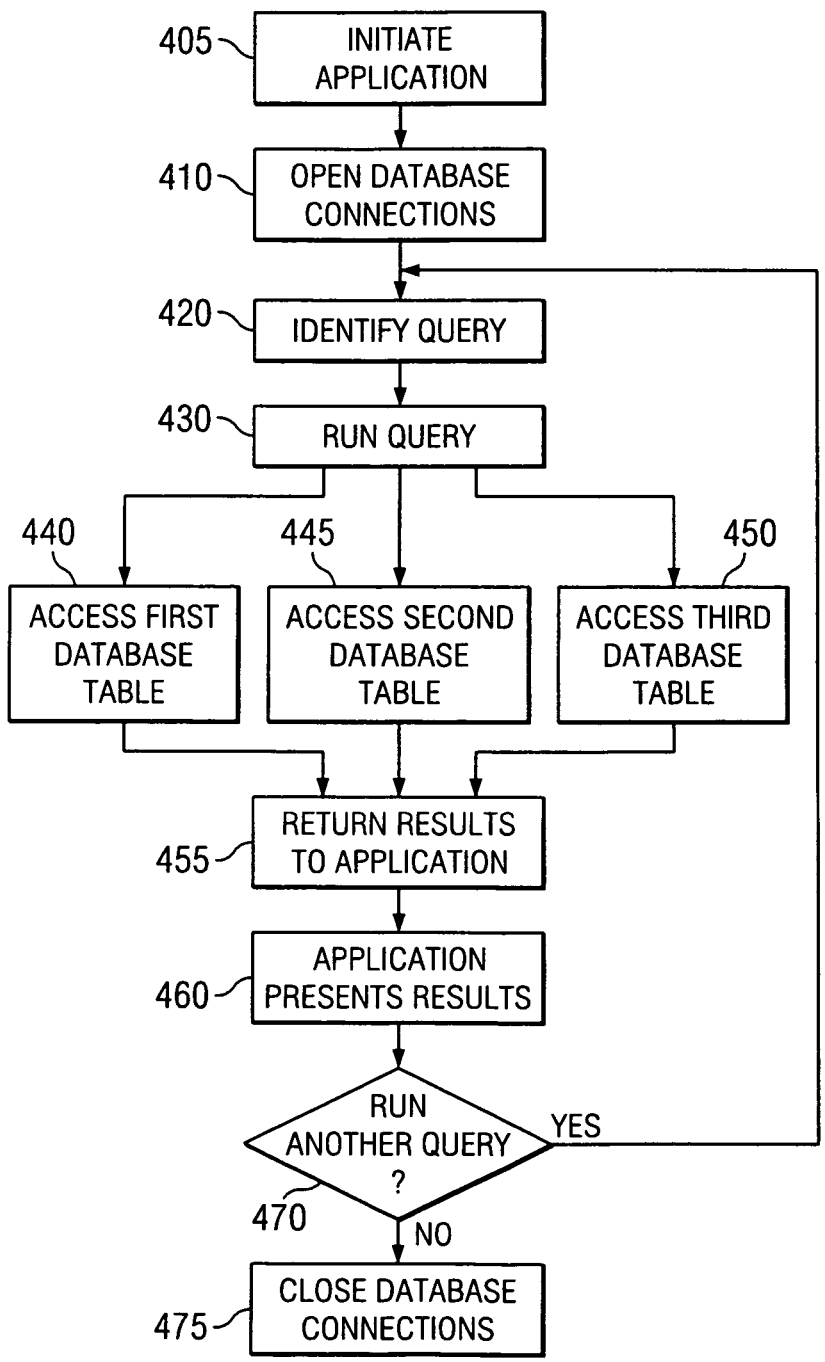
FIG. 4 is a flowchart illustrating database access after the addition of a generic index field according to a particular implementation of the present disclosure.

FIG. 4 is a flowchart illustrating an example method 400 for accessing database tables 210 after the generic index 310 is added to the database tables 210 of database 200. The process 400 begins by initiating the business application 130 at step 405. Once business application 130 is initiated, the application creates and/or opens connections to the database 200 at step 410. These database connections may be created using Open Database Connectivity (ODBC), Java Database Connectivity (JDBC), OLE DB, or any other suitable database connectivity protocol or technique. Once a connection between business application 130 and database 200 has been created and opened, the user and/or application instantiates a query 170 for data retrieval or update based upon desired data at step 420. This instantiate may include index and parameter population, dynamic query generation, or other database query processing. Query 170 is created such that each database table 210 having the generic index 310 as a key field may be accessed without query 170 knowing the remaining structure of the table. As such, multiple instances of the same query 170 may be used to access a plurality of database tables 210 without needing to modify the coding of the query 170 for differently structured tables. After generating the query 170, the user and/or application runs the query on a plurality of database tables 210. The table or tables queried may be specifically designated by the user and/or application, or the query 170 may be used such that each database table 210 is queried.

For example, illustrated method 400 shows query 170 accessing a first database table 440, a second database table 445, and a third database table 450. Three database tables are shown in FIG. 4 for illustrative purposes only and any number of tables may be accessed. Also, some of the plurality of database tables 210 may be stored within a second database 200. In other words, database tables 210 may reside in a single database 200 or data repository, as well as across numerous database, repositories, warehouses, and locations (whether physical or logical). For example, in FIG. 4, the third database 450 is located within a second database/repository. Also, the tables accessed in FIG. 4 may have varying structures such that each table is designed differently. In some implementations, database tables 210 may have identical structures. Regardless of their entire structure, the database tables of FIG. 4 contain a generic index 310 common to each of the database tables. At step 440, the query 170 generated is used to access a first database table wherein accessing the first database table may comprise creating, reading, updating, or deleting a database table record. Second and third instances of query 170 are used to access the second 445 and third database tables 450, respectively. Any results from accessing the database tables are then returned to the application in step 455. When appropriate, those results are then presented to the application at step 460 and potentially to the user via the GUI 116 of FIG. 1. The user and/or application then decides whether or not to generate and run an additional query 170 at step 470. These results may include some or all of the responding data records, a confirmation that the particular modification or deletion occurred, or any other suitable message. If another query 170 is to be run, then method 400 returns to step 420 where a new query is generated and the flowchart process repeated. Otherwise, the database (or session) connections are closed at step 475 and the process ends at step 480.

FIG. 5 presents the design view of a first layout of database table 210 located in database 200 of FIG. 1. Database table 210 includes Keyfield 510, the primary key of the database table 210. As primary key, Keyfield 510 uniquely identifies each row in database table 210, and may be defined as any data type. Standard data used as a primary key includes social security numbers, employee identification numbers, product serial numbers, or the like. Additionally, a generic index 310, comprised of a global unique identifier (GUID), client identifier, another unique identifier, or a combination thereof, may be designated as the primary key of database table 210. Additionally, database table 210 contains at least one other data field, represented in FIG. 5 as text_field 515, char_field 520, and date_time 525. The fields represented are only an illustration of both number and type of fields available. Available data types depend on the database 200 chosen when creating the environment 100. By first layout, the disclosure may refer to table 210 as originally designed, table 210 as it was designed when query 600 was identified, or table 210 as it otherwise exists at any point of time when query 600 first accesses the table for the particular process.

FIG. 6 illustrates the design view of a particular embodiment of a generic query 600 created to access records and tables of database 200. The generic query 600 may be designed to access tables of database 200 and perform functions including creating, reading, updating, or deleting records and/or tables. The generic query 600 illustrated in FIG. 6 is created to first access database table 210 as shown in FIG. 5. The query 600 has been created to display Keyfield 610, text_field 615, char_field 620, date_time 625, and a placeholder field named "~PLACEHOLDER" 650. The placeholder field "~PLACEHOLDER" 650 is used when creating the generic query 600 because it allows access to database tables 210 of differing structures without the need to recreate the generic query 600. The placeholder field will be used as the location of the additional fields to be inserted at run-time. In order to avoid confusion by the query analyzer, database manager, or other processing mechanism, the placeholder field may be named such that it its field name is distinct from any field names located in the database tables 210 to be accessed by generic query 600. The field name "~PLACEHOLDER" in query 600 is an example of such a name. Additionally, the field name may include a separator such as a "~" or other character that is not allowed to be present in database field names. By doing so, query 600 may be processed such that the separator allows the processing mechanism to differentiate between selection fields and the placeholder of the generic query 600.

The design view of query 600 has a "Status" field 660 accompanying each field name. This "Status" field 600 value may be changed from "active" to "inactive" depending on the query parameters requested by the user and/or application. In the current example where query 600 is used to access database table 210 as shown in FIG. 5, generic query 600 will not need to use the "~PLACEHOLDER" 650 field because all data fields included in table 210 have been accounted for in the query design. Therefore, the value of the "Status" field 660 for "~PLACEHOLDER" 650 will be "inactive." At runtime, when a field from query 600 has a "Status" field value of "inactive," that field will not be considered by the query and will be ignored when processing the query prior to accessing database table 210. Similar to other queries, the "CRITERIA" field 670 will determine the requirements for which fields are to be returned upon running query 600. In the particular embodiment shown, data records where text_field 615 contains the text "test", char_field 620 equals 1000, and date_time 625 is prior to October 20 will be returned. Different criteria may produce different results based on data records of database table 210. Additionally, when multiple data fields are included in the query 600, the "CRITERIA" fields 670 may be run in an AND situation, an OR situation, or a combination thereof. When run in an AND situation, all criteria must be met in order for a data record to be returned. If run in an OR situation, only one of the criteria must be met in order for a record to be returned. The "CRITERIA" field may be populated by users and/or applications in order to return data relevant to the current jobs or processes.

FIG. 7 presents the design view of a second layout for database table 210. In this particular embodiment, database table 210 has been modified such that two new data fields have been added to the table, int_field 630 and real_field 635. The new fields may have been included in database table 210 using certain database techniques such as a JOIN with another table, an APPEND of one or more outside data records or tables into database table 210, an INCLUDE of fields or tables of an outside structure, or any other technique adding data fields to database table 210 such that its structure is modified. In other embodiments, the second layout for database table 210 may have fewer data fields than the first layout in FIG. 5 after being modified with a DELETE method or similar technique. Additionally, some embodiments may create a second layout for database table 210 by changing the data type associated with one or more data fields of the table. Returning to FIG. 7, the structure of database table 210 has changed. Generic query 600, however, may still be used to access all fields of the second layout of database table 210. The field "~PLACEHOLDER" 650 represents the fields not explicitly included in the original generic query 600 but present in the second layout of database table 210 and requested by the present query by the user and/or the application. The field "~PLACEHOLDER" 650 will be necessary in order to search in the new fields of database table 210. Therefore, "Status" field 660 related to "~PLACEHOLDER" 650 may be set to "active" so that query 600 processes "~PLACEHOLDER" 650 along with the other query parameters.

Figures 8, 9:
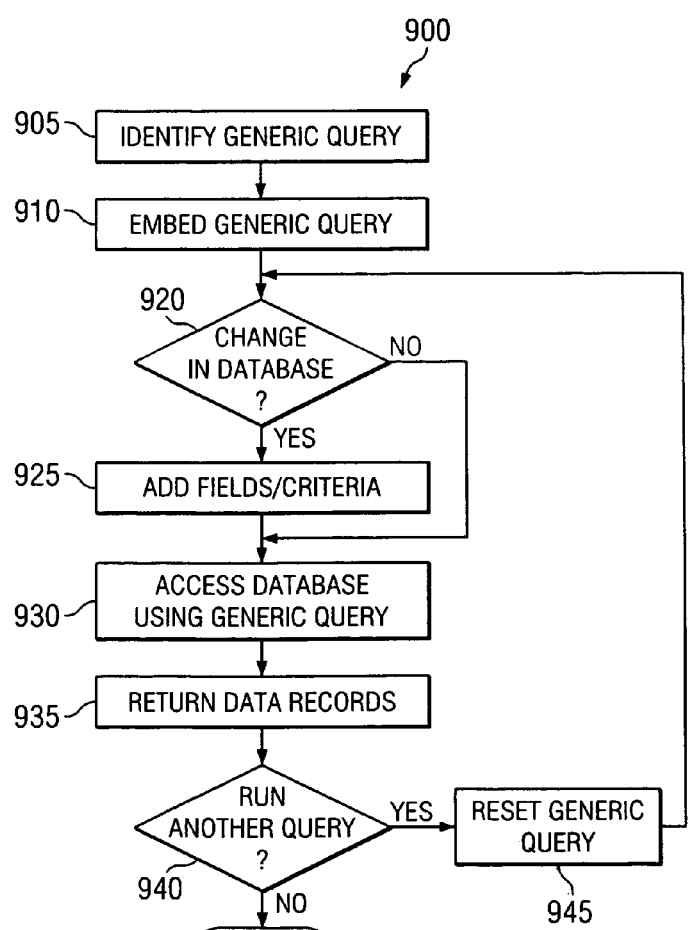
FIG. 8 illustrates a dialog box or other interface used in a particular embodiment of the generic query as utilized by the example system of FIG. 1.
FIG. 9 is a flowchart illustrating database access where a generic query is identified according to a particular implementation of the present disclosure.

FIG. 8 represents one possible embodiment of the generic query, a dialog box appearing at run-time when "~PLACEHOLDER" 650 has a "Status" value of "active." At run-time, business application 130 or other processing methods may process the "active" status of "~PLACEHOLDER" 650 and present the user and/or application with a method of inputting the additional fields and criteria into the generic query 600. One possible example is the use of a dialog box or other input method as presented via the GUI interface 116. In this embodiment, a dialog box 800 provides a method for inserting the field name 820 and criteria 830 of data fields into the current instance of generic query 600 that were not explicitly included in the first instance of generic query 600. Field name 820 values may be entered manually by a user and/or application, or alternatively a dynamic database process may access the field names from database table 210 and populate field names into a selection drop box or other selection device. As many additional fields may be added as desired by, for example, clicking on the box 810. Box 810 may be represented in various embodiments by radio buttons, checkboxes, or other input types. After the field names and criteria have been inserted, users may then run query 600, for example, by mouse-clicking the "RUN QUERY" button 840 in FIG. 8.

Having entered the additional fields and criteria into the query dialog box 800, processing of information from the dialog box 800 may occur and the data fields and criteria specified in FIG. 8 will be translated into the proper SQL form for accessing database table 210. In this manner, the generic query 600 is able to adapt to the layout modifications of the database table 210 such that multiple instances of the generic query 600 may be used without requiring constant rewriting of the access coding.

FIG. 9 presents a method 900 demonstrating a particular embodiment of identifying and using a generic query. The method 900 starts at step 905 where the user and/or application identifies a generic query 600. Identifying a generic query may involve selecting, generating, or otherwise processing the generic query 600. The generic query 600 may be identified prior to association or relation to a database table 210 and without specific (whether partial or total) knowledge regarding the structure of database table 210. The generic query 600 allows data fields and criteria to be defined before applying the query and/or for some fields and criteria to be defined at run-time based on user-defined or application-based input. At step 910, the generic query 600 may be embedded in a business application 130 associated with a database 200. In some instances, the generic query 600 will be embedded after having been identified independent any database table associated with the business application 130. The availability of an independent generic query 600 provides users and applications the ability to modify multiple instances of a single generic query 600 into queries specific to each particular database table 210.

Once the generic query 600 is embedded in the business application 130, the process determines whether the structure of database table 210 is such that modifications need be made to the generic query 600. For example, in some cases the decision would be based on whether additional data fields have been added to the structure via APPEND or JOIN operations. In others, the decision is made based on whether the generic query 600 was created independent of the database table 210 such that the fields and criteria included in query 600 must be defined. If database table 210 has a structure compatible with the generic query 600 identified at step 905, no modifications may be required and the process will continue on to step 930. However, if the generic query 600 needs to be modified or updated, the process details above regarding FIG. 8 will be performed at step 925. Any additional necessary fields may be selected along with the related criteria such that the generic query 600 will produce the desired data records. Upon modifying the generic query 600, the process moves to step 930, accessing the database table 210 using the generic query 600. The accessing of database table 210 can include creating, reading, updating, or deleting a record from the table, as well as other database modification techniques. The generic query 600 accesses the data records specified in the query, returning the data requested to the user and/or application 935.

In many instances, the business application 130 may be programmed to run a plurality of queries. At 940, the process chooses whether more queries will be run. If more queries are unnecessary or unwanted, the process ends. However, if additional queries are desired, the process moves to step 945 wherein the modifications to the generic query 600 may be removed. The generic query 600 may be returned to its initial state that it was in originally after step 905 of the flowchart. This may ensure that the modifications made to the generic query 600 are not carried though multiple instances and database accessing. Once the modifications are removed, the process returns to step 920. Throughout the process of 900, the structure of database table 210 may be modified a plurality of times both before and after any generic queries 600 are run. These table modifications, however, do not require users and/or applications to modify generic query 600. Therefore, multiple instances of the generic query may be used to access a plurality of database table layouts.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An article comprising computer readable instructions for accessing a database table, the computer readable instructions stored on a non-transitory computer readable medium and operable when executed by a processor to:
   identify a generic query such that the generic query is independent of a particular database layout, wherein the generic query comprises:
      a standard portion of the generic query common to each instance of the generic query; and
      a placeholder that represents one or more database table fields excluded from the standard portion of the generic query and is operable to be activated or deactivated based upon the particular layout of an associated database table;
   execute a first instance of the generic query against a first database table having a first layout, the placeholder deactivated in the first instance of the generic query based on the first layout; and
   execute a second instance of the generic query against a second database table having a second layout disparate from the first layout, wherein particular fields of the placeholder specific to the second database table are activated in the second instance of the generic query based on the second layout.

2. The article of claim 1, wherein computer readable instructions comprise a business application, the generic query is embedded in the business application associated with the database, and the application is decoupled from the layout of the database table.

3. The article of claim 1, wherein the generic query is embedded before the database table is created.

4. The article of claim 1, wherein the second database table is generated after appending at least one data field into the first database table.

5. The article of claim 1, wherein the second database table is generated after deleting at least one data field from the first database table.

6. The article of claim 1, wherein the second database table is generated by joining a table to the first database table.

7. The article of claim 1, wherein the second database table is generated by changing the data type of at least one data field in the first database table.

8. The article of claim 1, wherein executing the first instance of the generic query against the database table comprises:
   determining whether the first layout of the first database table is compatible with the standard portion of the generic query; and
   if the first layout of the first database table is incompatible with the standard portion of the generic query, then modifying the generic query by populating the placeholder with one or more additional fields associated with the first layout of the first database table.

9. The article of claim 1, wherein the first database table is the same as the second database table.

10. The article of claim 1, wherein the standard portion of the generic query is generated at design time.

11. An article comprising computer readable instructions for accessing a database table, the computer readable instructions stored on a non-transitory computer readable medium and operable when executed by a processor to:
   execute a first instance of a generic query against a database table having a first layout, wherein the generic query is independent of a particular database layout and comprises:
      a standard portion of the generic query; and
      a placeholder that represents one or more database table fields excluded from the standard portion of the generic query and is operable to be activated or deactivated based upon the particular layout of an associated database table;
   modify the database table such that the database table has a second layout; and
   execute a second instance of the generic query against the database table having a second layout, wherein executing the second instance of the generic query further comprises:
      activating the placeholder in the generic query at runtime of the generic query; and
      populating the placeholder in response to the modifications of the database table.

12. The article of claim 11, wherein the modifying of the database table is performed by appending at least one data field into the database table.

13. The article of claim 11, wherein the modifying of the database table is performed by deleting at least one data field from the database table.

14. The article of claim 11, wherein the modifying of the database table is performed by joining a table to the database table.

15. The article of claim 11, wherein the modifying of the database table is performed by changing the data type of at least one data field in the database table.

16. The article of claim 11, wherein the placeholder is represented by a name distinct from field names of the database table.

17. The article of claim 11, wherein the generic query contains a separator.

18. The article of claim 11, wherein the placeholder is deactivated to execute the first instance of the generic query against the database table having the first layout.

19. The article of claim 11, wherein only the standard portion of the first instance of the generic query is executed against the database table having the first layout.

20. The article of claim 11, wherein the standard portion of the generic query is generated at design time.

21. A computerized method for generically querying database tables, the method comprising the following steps performed by at least one processor:
   executing a first instance of a generic query against a database table having a first layout, wherein the generic query is independent of a particular database layout and comprises:
      a standard portion of the generic query; and
      a placeholder that represents one or more database table fields excluded from the standard portion of the generic query and is operable to be activated or deactivated based upon the particular layout of an associated database table;
   modifying the database table such that the database table has a second layout; and
   executing a second instance of the generic query against the database table having a second layout, wherein executing the second instance of the generic query against the database table having the second layout further comprises:
      activating the placeholder in the generic query at runtime of the generic query; and
      populating the placeholder in response to the modifications of the database table.

22. The method of claim 21, wherein the modifying of the database table is performed by appending at least one data field into the database table.

23. The method of claim 21, wherein the modifying of the database table is performed by deleting at least one data field from the database table.

24. The method of claim 21, wherein the modifying of the database table is performed by joining a table to the database table.

25. The method of claim 21, wherein the modifying of the database table is performed by changing the data type of at least one data field in the database table.

26. The method of claim 21, wherein the placeholder is represented by a name distinct from field names of the database table.

27. The method of claim 21, wherein the generic query contains a separator.

28. The method of claim 21, wherein the placeholder is deactivated to execute the first instance of the generic query against the database table having the first layout.

29. The method of claim 21, wherein only the standard portion of the first instance of the generic query is executed against the database table having the first layout.

* * * * *